(12) United States Patent
Eriksen

(10) Patent No.: US 9,627,940 B2
(45) Date of Patent: Apr. 18, 2017

(54) ELECTROMECHANICAL ACTUATOR DEVICE AND METHOD OF ACTUATING A RING PISTON

(71) Applicant: Electrical Subsea & Drilling AS, Straume (NO)

(72) Inventor: Egil Eriksen, Vassenden (NO)

(73) Assignee: ELECTRICAL SUBSEA & DRILLING AS, Straume (NO)

( * ) Notice: Subject to any disclaimer, the term of this patent is extended or adjusted under 35 U.S.C. 154(b) by 429 days.

(21) Appl. No.: 14/374,745

(22) PCT Filed: Feb. 7, 2013

(86) PCT No.: PCT/NO2013/050024
§ 371 (c)(1),
(2) Date: Jul. 25, 2014

(87) PCT Pub. No.: WO2013/119127
PCT Pub. Date: Aug. 15, 2013

(65) Prior Publication Data
US 2014/0354096 A1 Dec. 4, 2014

(30) Foreign Application Priority Data

Feb. 10, 2012 (NO) .................................. 20120136
Jan. 25, 2013 (NO) .................................. 20130129

(51) Int. Cl.
*H02K 7/06* (2006.01)
*H02K 5/132* (2006.01)
(Continued)

(52) U.S. Cl.
CPC ............... *H02K 7/06* (2013.01); *E21B 33/06* (2013.01); *E21B 41/04* (2013.01); *H02K 3/28* (2013.01); *H02K 5/132* (2013.01); *H02K 7/14* (2013.01)

(58) Field of Classification Search
CPC ......... E21B 33/06; E21B 41/04; H02K 5/132; H02K 7/14; H02K 3/28; H02K 7/06
(Continued)

(56) References Cited

U.S. PATENT DOCUMENTS

| 5,099,161 A | 3/1992 | Wolfbauer, III |
| 5,952,744 A | 9/1999 | Chitayat |

(Continued)

FOREIGN PATENT DOCUMENTS

| EP | 0601185 A1 | 6/1994 |
| EP | 1748537 A2 | 1/2007 |

(Continued)

OTHER PUBLICATIONS

International search report and written opinion for application No. PCT/NO2013/050024 dated May 6, 2013.

(Continued)

*Primary Examiner* — Naishadh Desai
(74) *Attorney, Agent, or Firm* — Patterson & Sheridan, LLP

(57) ABSTRACT

An electromechanical actuator device (17) and method for use under water in petroleum activity, in which, via a transmission element (30, 34, 36), an electric motor (18), including a stator (20) and a rotor (22), is arranged to move an actuation element (36) between at least a first position and a second position, and in which the rotor (22) of the electric motor (18) surrounds and is connected to an actuator nut (30) which is in threaded engagement with the actuation element (36).

9 Claims, 6 Drawing Sheets

(51) Int. Cl.
*E21B 33/06* (2006.01)
*E21B 41/04* (2006.01)
*H02K 3/28* (2006.01)
*H02K 7/14* (2006.01)

(58) Field of Classification Search
USPC .................................................. 310/87–89
See application file for complete search history.

(56) References Cited

U.S. PATENT DOCUMENTS

| | | | |
|---|---|---|---|
| 8,910,720 B2* | 12/2014 | Aguirre | E21B 4/18 |
| | | | 166/241.1 |
| 8,941,276 B2* | 1/2015 | Haferman | H02K 1/278 |
| | | | 310/83 |
| 2004/0056229 A1 | 3/2004 | Biester | |
| 2004/0134662 A1* | 7/2004 | Chitwood | E21B 4/04 |
| | | | 166/367 |
| 2008/0271553 A1* | 11/2008 | Wang | F16D 65/18 |
| | | | 74/89.34 |
| 2011/0203396 A1 | 8/2011 | Hyun | |
| 2012/0017674 A1* | 1/2012 | Kumar | B82Y 30/00 |
| | | | 73/152.54 |

FOREIGN PATENT DOCUMENTS

| | | |
|---|---|---|
| WO | 2006048616 A1 | 5/2006 |
| WO | 2011005519 A2 | 1/2011 |
| WO | 2011126378 A1 | 10/2011 |

OTHER PUBLICATIONS

International preliminary report on patentability for application No. PCT/NO2013/050024 dated Feb. 3, 2014.

* cited by examiner

IA-Ia

Ib-Ib

ELECTROMECHANICAL ACTUATOR DEVICE AND METHOD OF ACTUATING A RING PISTON

This invention relates to an electromechanical actuator. More particularly, it relates to an electromechanical actuator for use under water in petroleum activity, in which, via a transmission element, an electric motor, including a stator and a rotor, is arranged to move an actuation element between at least a first position and a second position. The invention also includes a method of constructing the actuator.

During the recovery of petroleum offshore, it is necessary to be able to manoeuvre well tools, valves, couplings or sealing devices, for example. Equipment of this kind may be provided with a centre bore, at least to enable fluid throughflow or the passage of equipment in connection with different operations.

Conventionally, equipment of this kind has been operated hydraulically. Hydraulic operation is often conditional on hydraulic lines being extended from the surface. To achieve accurate manoeuvring and necessary system redundancy it is necessary to arrange valves near the actuator. In addition to such hydraulic systems being relatively large and expensive, leakages of hydraulic fluid into the surroundings may occur.

Because of the drawbacks mentioned and others associated with hydraulic systems, electromechanical actuators for use under water have been developed. Such actuators are typically characterized by being provided with two drive systems and, in addition, being arranged to be manoeuvred by means of an extern& motor, for example an ROV (Remotely Operated Vehicle).

US 2004/0056229 thus discloses an electromechanical actuator for an underwater throttling valve, the actuator being provided with two independent electromotors driving a rotatable spindle via a worm. The spindle is formed with a self-locking function.

WO 2005 068774 also discloses an electromechanical actuator which is provided with two electromotors, the motors being connected to a rotatable output shaft.

Generally, known electromechanical actuators for use under water are relatively large, complicated and expensive.

The invention has for its object to remedy or reduce at least one of the drawbacks of the prior art or at least provide a useful alternative to the prior art.

The object is achieved through features which are specified in the description below and in the claims that follow.

According to a first aspect of the invention, an electromechanical actuator is provided for use under water in petroleum activity, in which, via a transmission element, an electric motor, including a stator and a rotor, is arranged to move an actuation element between at least a first position and a second position. The actuator is characterized by the rotor of the electric motor surrounding and being connected to an actuator nut which is in threaded engagement with the actuation element.

The structure enables a compact form of construction, in which relatively large actuation forces can be achieved.

The actuator may easily be provided with, for example, a position transmitter which, being connected to a control system, can indicate the relative position of the actuation element in the actuator at all times. It is also easy to control the actuating force exerted on the actuator element by the motor by means of the power supplied. Thus, from a position on the surface, an operator may control both the force and the relative position of the actuation element in the actuator.

The external diameter of the actuator nut may correspond to the internal diameter of the rotor. A further reduction of the constructional dimensions is thereby achieved because the actuator nut virtually constitutes a unit with the rotor.

The moving direction of the actuation element may be parallel to the rotational axis of the motor. The solution shown demonstrates that axial displacement of the actuation element may be provided with relatively small constructional dimensions.

The actuation element may also surround a central through-going opening which may constitute a fluid path and which may also be adapted for the passage of tools.

The invention makes it possible for a relatively large through-going opening through the actuator to be provided without major changes to the external dimensions.

The actuator is in a pressure-compensated actuator housing in which, in a manner known per se, the pressure is compensated relative to the surroundings by means of an elastic compensator communicating with the ambient pressure.

The actuator nut may include a threaded roller which is in threaded engagement with the actuation element. In another embodiment, the actuator nut may form part of a ball screw. Both solutions, known from SKF's catalogues, for example, may be adapted for the actuator and constitute machine elements in which relatively large forces may be transmitted with relatively little friction between the machine elements.

The motor may include at least two individual sets of windings to provide the necessary redundancy.

According to a second aspect, a method is provided for an electromechanical actuator for use under water in petroleum activity, in which, via a transmission element, an electric motor, including a stator and a rotor, is arranged to move an actuation element between at least a first position and a second position, the method including:

letting the rotor of the electric motor surround and be connected to an actuator nut; and letting the actuator nut be in threaded engagement with the actuation element.

The method may include building at least two mutually independent sets of windings into the motor.

A device and a method according to the invention make it possible for an actuator for axial displacement to be formed with a relatively large through-going bore while, at the same time, the outer dimensions are relatively small. As mentioned above, the actuator is controllable with respect to both force and position. It has turned out that the actuation element may be positioned with great accuracy relative to the actuator.

In what follows, an example of a preferred embodiment and method is described, which is visualized in the accompanying drawings, in which.

Figure 1:
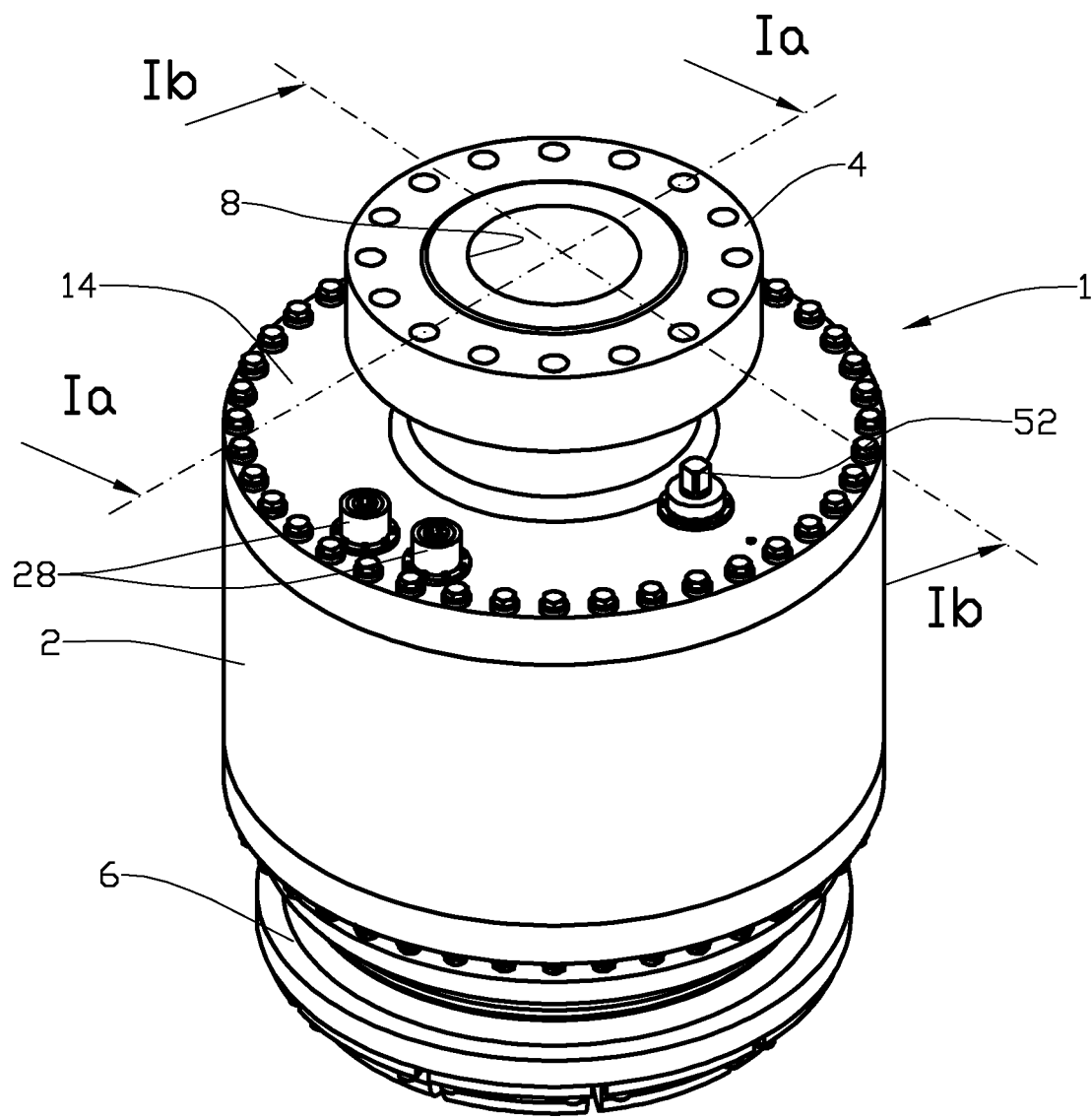
FIG. 1 shows, in perspective, a coupling for a wellhead, the coupling being provided with an actuator in accordance with the invention.

In the drawings, the reference numeral 1 indicates a coupling for a wellhead, the coupling 1 including a cylinder-shaped actuator housing 2, a pipe flange 4 for connection to a pipe system not shown, and a coupling flange 6. A through-going opening 8 extends axially through the coupling 1.

Figure 2:
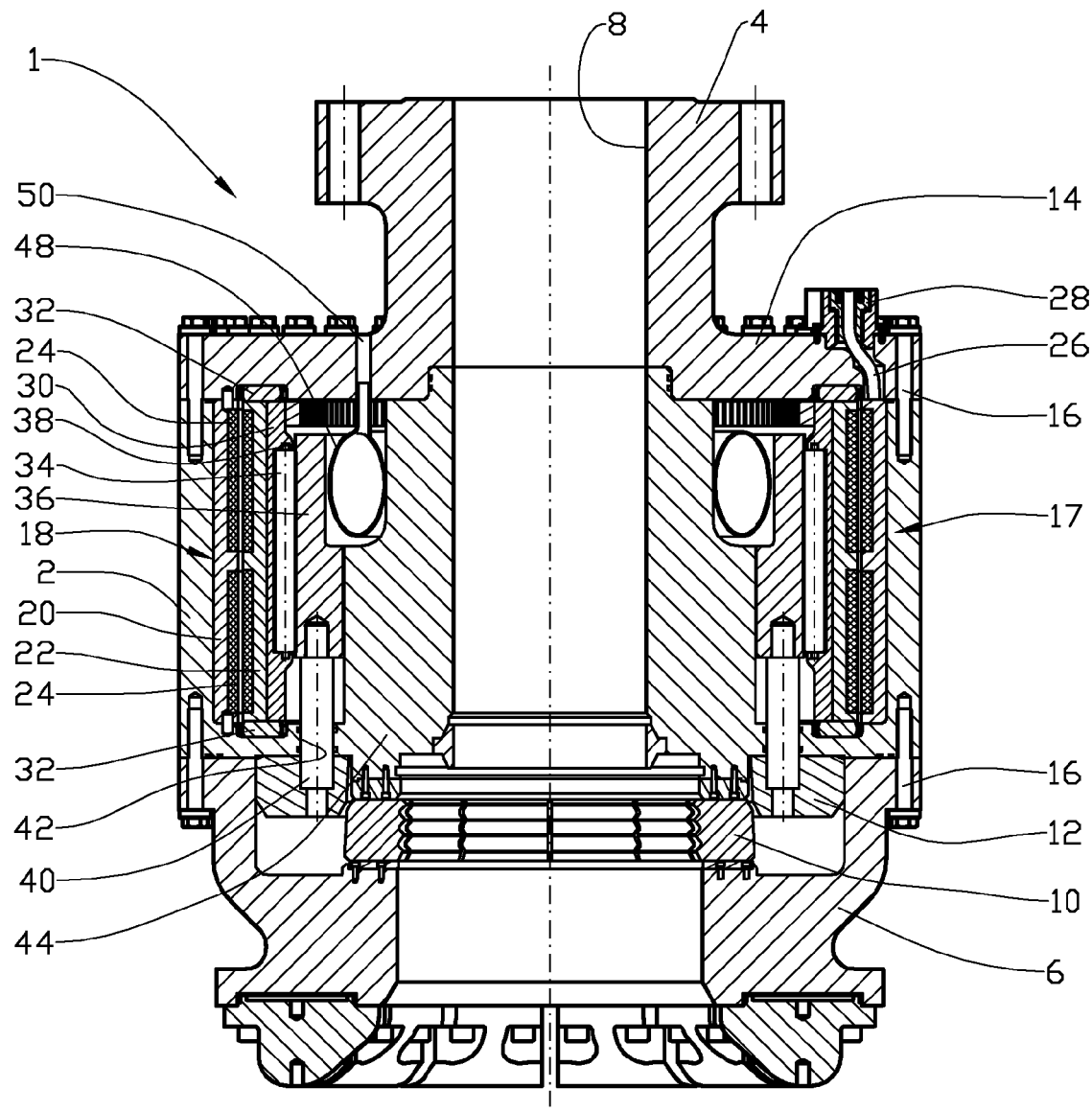
FIG. 2 shows a section 1*a*-1*a* of FIG. 1.

The coupling flange 6 known per se, see FIG. 2, includes a number of locking segments 10 which are distributed around the opening 8, the locking segments 10 being arranged, by being moved radially relative to the opening 8, to grip around an object, not shown which is in the opening 8. The radial displacement of the locking segments 10 is provided by moving an internally conical locking ring 12, which surrounds the locking segments 10, axially relative to the locking segments 10.

The actuator housing 2 is arranged between an end cap 14, which includes the pipe flange 4, and the coupling flange 6 and is attached to them by means of bolts 16.

An actuator 17 includes an electric motor 18 with an external stator 20 and an internal rotor 22. The stator 20 fits into the actuator housing 2 and is attached to it in such a way that it is prevented from moving relative to the actuator housing 2.

The motor 18 is provided with two independent sets of windings 24 which are energized via respective cables 26. Each cable 26 extends in a sealing manner through a respective cable bushing 28 in the end cap 14.

An actuator nut 30 is arranged internally in the rotor 22 and is attached to it. The rotor 22 together with the actuator nut 30 is supported in the radial and axial directions by means of bearings 32 which are arranged at the end portions of the rotor 22 and the actuator nut 30. The actuator nut 30 thus corotates with the rotor 22.

In this preferred exemplary embodiment, the actuator nut 30 is provided with a number of supported threaded rollers 34 arranged axially, distributed around a cylindrical actuation element 36. The threaded rollers 34 which are arranged to rotate freely around their own longitudinal axes in the actuator nut 30, are engaged in external threads 38 on the actuation element 36. The actuator nut 30, the threaded rollers 34 and the actuation element 36 thereby constitute a transmission element for transmitting power from the motor 18 to the actuation element 36.

A number of guide bolts 40 are attached to the actuation element 36 at their one end portions and extend through respective bores 42 in the actuator housing 2, the guide bolts 40 being connected, at their opposite end portions, to the locking ring 12. The guide bolts 40 are spaced apart and are also arranged to be able to prevent the actuation element 36 from rotating together with the actuator nut 30.

An internal portion 44 of the actuator housing 2 constitutes a guide for the actuation element 36 and forms part of the opening 8.

The actuator housing 2 is filled with a fluid, typically silicone oil, and pressure-compensated by means of an elastic pressure compensator 48 which communicates with the surrounding fluid via a channel 50 through the end cap 14.

The necessary seals have not been described but are known to a person skilled in the art.

Figure 3:
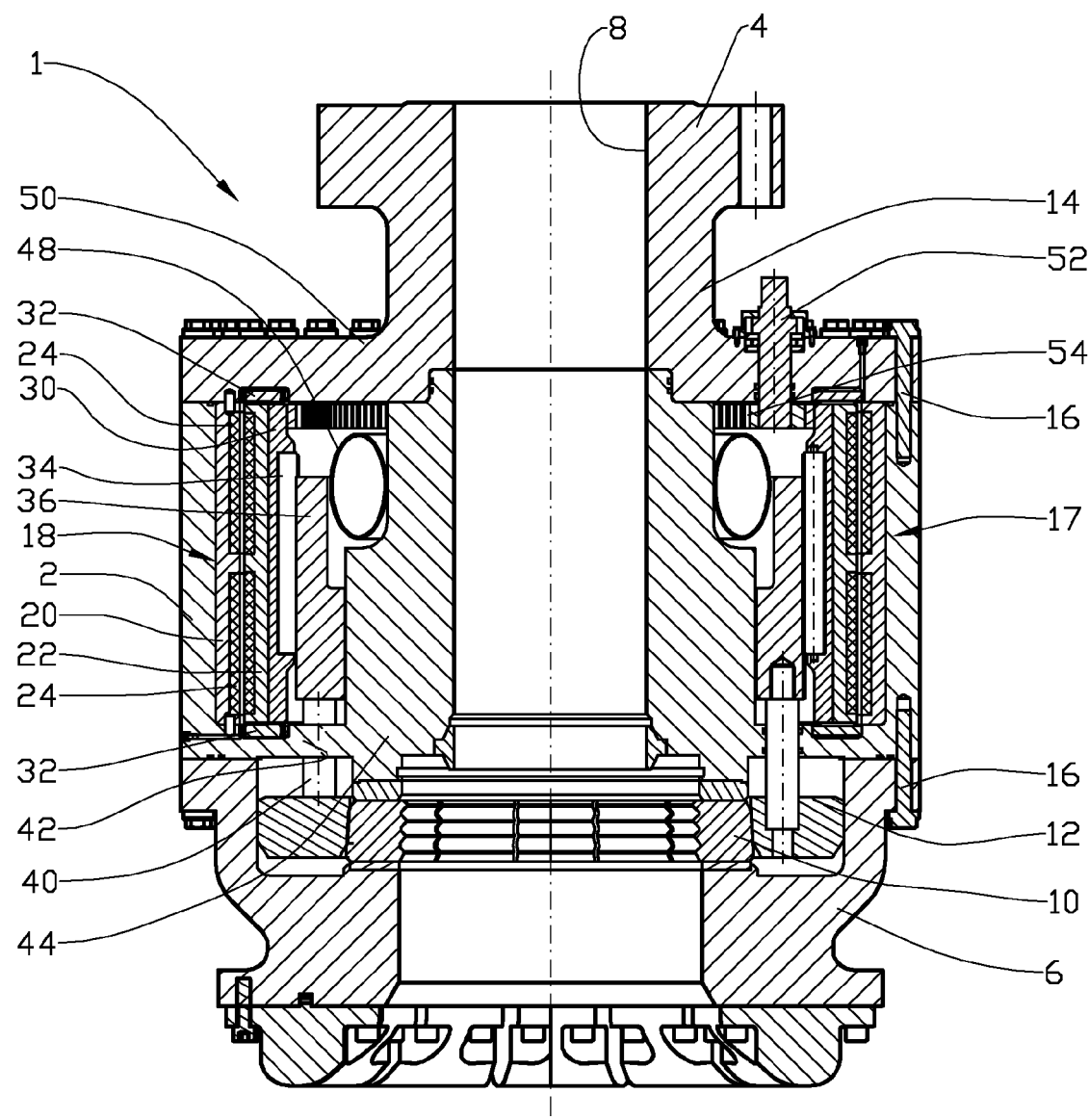
FIG. 3 shows a section 1*b*-1*b* of FIG. 1.

In FIG. 3, a rotatable connector 52 is shown, for connecting to an external motor not shown. The connector 52 is connected by means of transmission elements 54 to the actuator nut 30 and arranged to rotate it.

When the locking segment 10 of the coupling flange 6 is to be activated, the motor 18 is started by energy being supplied via the cable 26 to one of the windings 24. The actuator nut 30 is thereby set into rotation, whereby the rollers 34 are brought to roll against the threads 38 of the actuation element 36. The actuation element 36 is thereby shifted, bringing the locking ring 12 axially in over the locking segments 10 as it is shown in FIG. 3.

Figure 4:
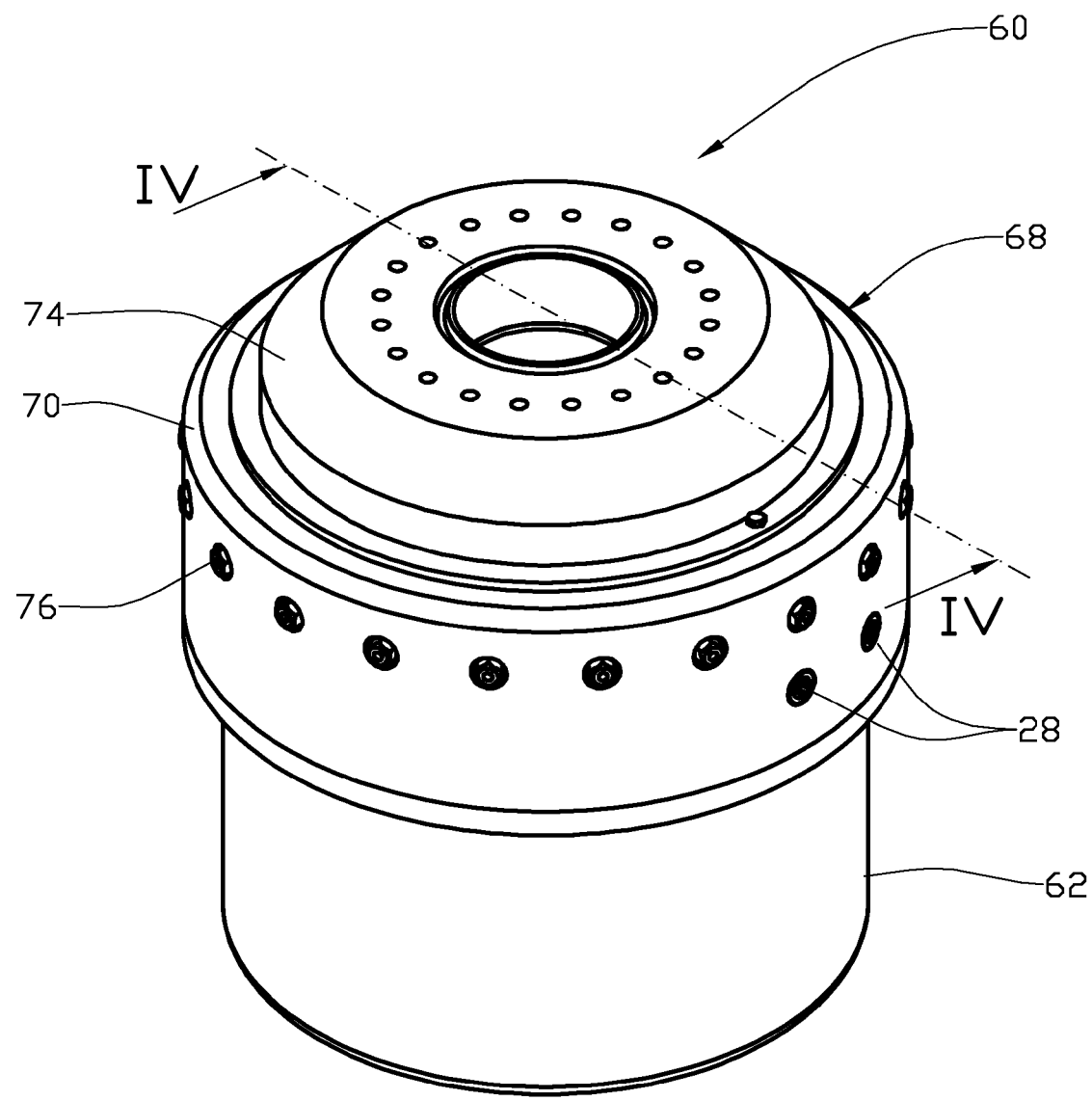
FIG. 4 shows, in perspective, a sealing device in a blowout preventer, the sealing device being formed with an actuator in accordance with the invention.
Figure 5:
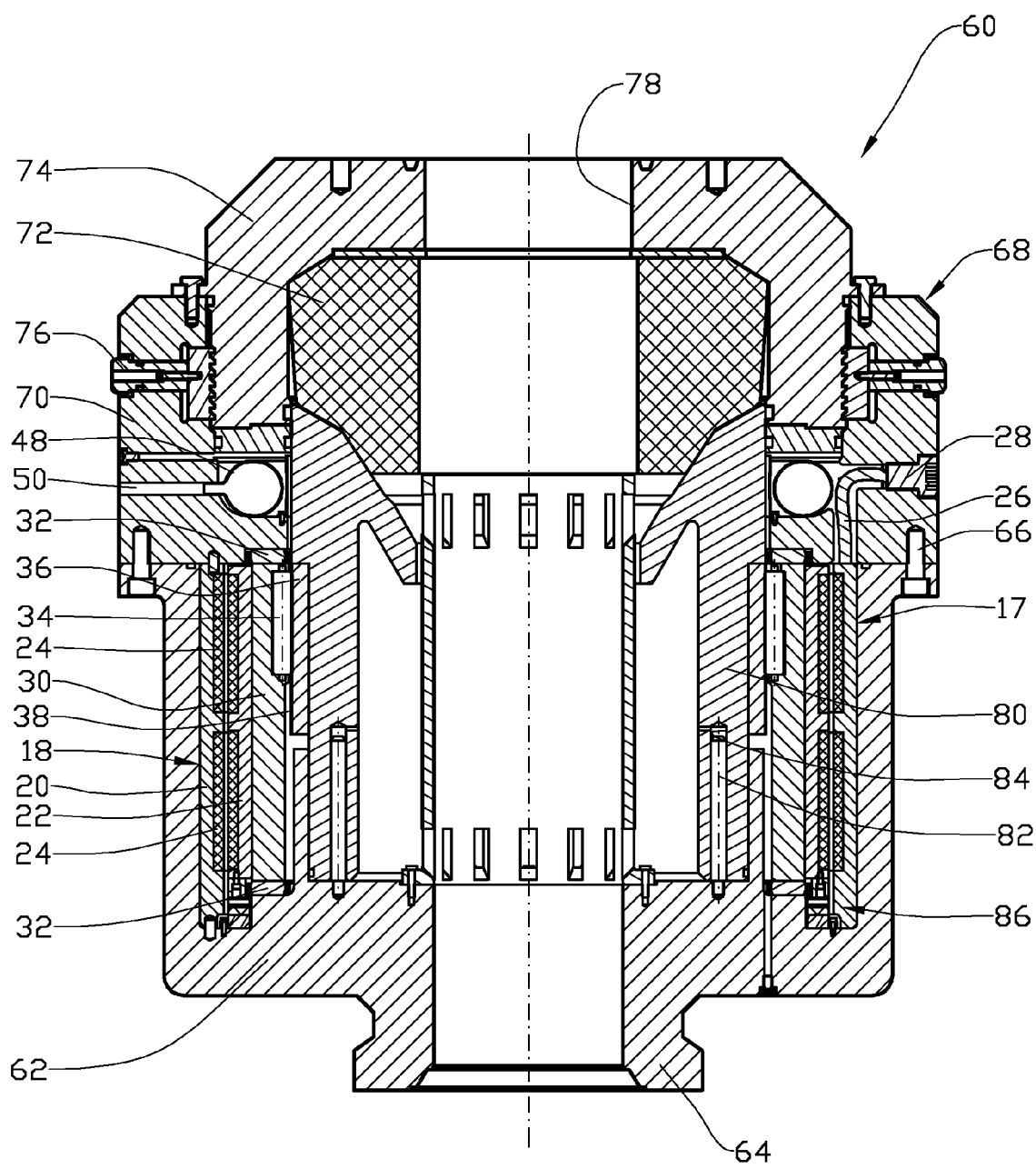
FIG. 5 shows a section IV-IV of FIG. 4.
Figure 6:
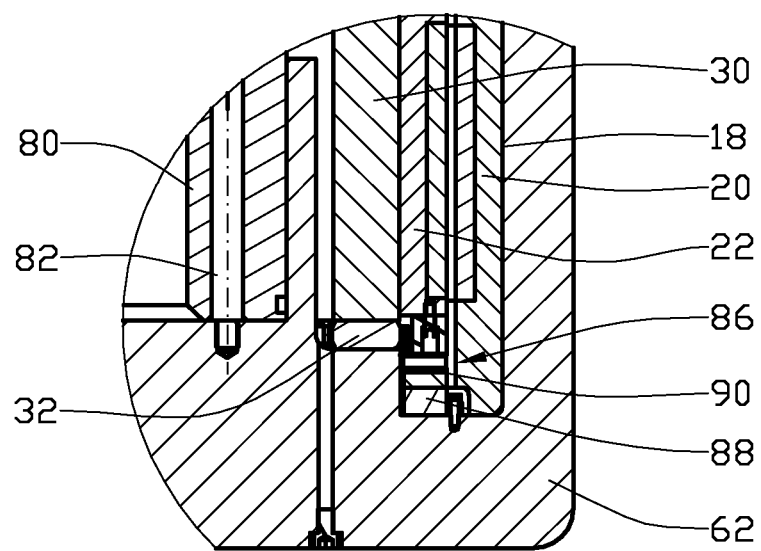
FIG. 6 shows, on a larger scale, a section of FIG. 5.

In an alternative exemplary embodiment which is shown in FIGS. 4, 5 and 6, the actuator 17 according to the invention has been built into a sealing device 60 for a blowout preventer.

At its one end portion, an actuator housing 62 is provided with a flange 64 for connection to a pipe system not shown. At its opposite end portion, the actuator housing 62 is connected by means of bolts 66 to a seal holder 68 of a design known per se. The seal holder 68 includes a seal-holder housing 70 and an elastic seal element 72 which is held in place by a cover 74. The cover 74 is attached to the seal-holder housing 70 by means of attachment elements 76 which are not described any further here.

A through-going, centric opening 78 extends through the sealing device 60.

The structure and operation of the motor 18, actuator nut 30 and actuation element 36 correspond to those described for the preceding exemplary embodiment.

In this exemplary embodiment, the actuation element 36 surrounds a ring piston 80 to which the actuation element 36 is attached. The ring piston 80 is axially displaceable and prevented from rotating with the actuator nut 30 by a number of guide bolts 82, which are fixed to the actuator housing 62, extending into axial bores 84 in the ring piston 80.

When the sealing element 72 is to be brought to seal around an element not shown, which is in the opening 78, the motor 18 is started, whereby the actuation element 36 moves the ring piston 80 against the sealing element 72. The sealing element 72 is deformed, thereby sealing against the element not shown.

In FIG. 6, a section of FIG. 5 is shown, in which an electromagnetic brake 86 is is connected to the motor 18. A brake coil 88 is energized when the motor 18 is to be started, whereby a friction ring 90 which is normally resting against the rotor 22 is disengaged.

The invention claimed is:

1. An electromechanical actuator device for use under water in petroleum activity, in which, via a transmission element, an electric motor, including a stator and a rotor, is arranged to move an actuation element between at least a first position and a second position, wherein the rotor of the electric motor surrounds and is connected to an actuator nut which is in threaded engagement with the actuation element, wherein the actuation element surrounds a through-going opening.

2. The device in accordance with claim 1, wherein the external diameter of the actuator nut corresponds to the internal diameter of the rotor.

3. The device in accordance with claim 1, wherein the moving direction of the actuation element is parallel to the rotational axis of the motor.

4. The device in accordance with claim 1, wherein the actuator is in a pressure-compensated actuator housing.

5. The device in accordance with claim 1, wherein the actuator nut includes a threaded roller which is in threaded engagement with the actuation element.

6. The device in accordance with claim 1, wherein the actuator nut forms part of a ball screw.

7. The device in accordance with claim 1, wherein the motor includes at least two independent sets of windings.

8. A method for an electromechanical actuator for use under water in petroleum activity, in which, via a transmission element, an electric motor, including a stator and a rotor, is arranged to move an actuation element between at least a first position and a second position, wherein the rotor of the electric motor surrounds and is connected to an actuator nut which is in threaded engagement with the actuation element, wherein the method includes letting the actuation element surround a through-going opening.

9. The method in accordance with claim 8, wherein the method includes building at least two individual sets of windings into the motor.

\* \* \* \* \*